(12) United States Patent
Caskey et al.

(10) Patent No.: US 8,270,606 B2
(45) Date of Patent: Sep. 18, 2012

(54) OPEN ARCHITECTURE BASED DOMAIN DEPENDENT REAL TIME MULTI-LINGUAL COMMUNICATION SERVICE

(75) Inventors: Sasha Porto Caskey, New York, NY (US); Danning Jiang, Beijing (CN); Wen Liu, Beijing (CN); David Lubensky, Brookfield, CT (US); Yong Qin, Beijing (CN); Andrzej Sakrajda, Briarcliff Manor, NY (US); Cheng Wu, Kisco Park, NY (US)

(73) Assignee: International Business Machines Corporation, Armonk, NY (US)

( * ) Notice: Subject to any disclaimer, the term of this patent is extended or adjusted under 35 U.S.C. 154(b) by 1175 days.

(21) Appl. No.: 12/113,567

(22) Filed: May 1, 2008

(65) Prior Publication Data

US 2009/0274299 A1 Nov. 5, 2009

(51) Int. Cl.
*H04L 29/12* (2006.01)
(52) U.S. Cl. .......... 380/255; 380/257; 726/29; 713/152; 713/153
(58) Field of Classification Search .................. 380/257, 380/278, 280, 282; 726/3, 7, 19, 29; 713/152, 713/153, 180
See application file for complete search history.

(56) References Cited

U.S. PATENT DOCUMENTS

| | | | | |
|---|---|---|---|---|
| 5,715,466 | A * | 2/1998 | Flanagan et al. | 704/5 |
| 6,424,992 | B2 * | 7/2002 | Devarakonda et al. | 709/203 |
| 2002/0026575 | A1 * | 2/2002 | Wheeler et al. | 713/156 |
| 2008/0004880 | A1 * | 1/2008 | Acero et al. | 704/270.1 |
| 2008/0300852 | A1 * | 12/2008 | Johnson et al. | 704/2 |
| 2009/0178130 | A1 * | 7/2009 | Botz et al. | 726/10 |
| 2010/0067705 | A1 * | 3/2010 | Boccon-Gibod et al. | 380/285 |

OTHER PUBLICATIONS

Henrik Frystyk Nielsen and Satish Thatte, Web Services Routing Protocol (WS-Routing), Copyright 2001, Microsoft Corporation, retrieved from http://msdn.microsoft.com/en-us/library/ms951249.aspx on May 18, 2011.*
Peter S. Kruus, A Survey of Multicast Security Issues and Architectures, Oct. 6, 1998, Naval Research Laboratory, presented at the 21st National Information Systems Security Conference, Arlington, VA, downloaded from http://citeseerx.ist.psu.edu/viewdoc/summary?doi=10.1.1.75.1681 on Nov. 8, 2011.*

* cited by examiner

*Primary Examiner* — Carl Colin
*Assistant Examiner* — Gary Lavelle
(74) *Attorney, Agent, or Firm* — Tutunjian & Bitetto, P.C.; Anne V. Dougherty, Esq.

(57) ABSTRACT

A system and method for real-time network communications provides a session identifier as a public key for group communication between clients, and provides a channel identifier representing a private key for each of a plurality of clients. The channel identifier includes client-specific attributes, which function to indicate grouping criteria for the group communication. A dynamic communication link is created over a network between a client and a service based upon the public and private key combination such that group communication is enabled based upon the attributes of the private key and the public key. Communications are translated using a translation service which employs the attributes associated with the private key and the public key combination to provide response information in a designated language to enable multi-lingual real-time communications.

24 Claims, 4 Drawing Sheets

OPEN ARCHITECTURE BASED DOMAIN DEPENDENT REAL TIME MULTI-LINGUAL COMMUNICATION SERVICE

BACKGROUND

1. Technical Field

The present invention relates to multilingual communications and in particular to systems and methods for real-time multi-lingual translated communications.

2. Description of the Related Art

The ever increasing globalization of the economy and popularity of social networking create more and more situations where discourse takes place between people using different languages. The participants can be further grouped by a topic (domain) of the conversation. The challenge is how to organize such multi-lingual conversation based on interest groups and find an efficient way to host it on the internet.

Currently there are no effective solutions for this problem, and there are no services offering a practical real-time multi-lingual conversation environment. Today's speech and language technologies (Automatic Speech Recognition, Machine Translation, and Text-to-Speech) are mature enough to help cross-lingual conversation in some well-defined domains. However, the challenge of having an open structure for organizing such cross-lingual conversations and make the open structure available to a large population, such as social networking groups, cannot be solved by these technologies alone.

Direct communication between a client and server on the internet is frequently impossible due to the presence of firewalls and proxy servers between peers. Thus, a direct client-server link is not a reasonable means of communication in this case. A data streaming based Distributed Speech Recognition (DSR) solution does not provide a control channel so it is difficult to have the flexibility for selecting different languages or domains dynamically.

SUMMARY

A system and method for real-time network communications provides a session identifier as a public key for group communication between clients, and provides a channel identifier representing a private key for each of a plurality of clients. The channel identifier includes client-specific attributes, which function to indicate grouping criteria for the group communication. A dynamic communication link is created over a network between a client and a service based upon the public and private key combination such that group communication is enabled based upon the attributes of the private key and the public key. Communications are translated using a translation service which employs the attributes associated with the private key and the public key combination to provide response information in a designated language to enable multi-lingual real-time communications.

A system and method for real-time multi-lingual communications includes providing a channel identifier representing a private key for each of a plurality of clients and providing a session identifier as a public key for clients to communicate. A dynamic link is created over a network between a client and a service for communications using the public and private key combination. Communications are translated using a translation service which employs attributes associated with the private key and the public key combination to provide response information in a designated language to enable multi-lingual real-time communications.

A method for real-time multi-lingual communications provides a channel identifier representing a private key for each of a plurality of clients where the private key includes a selection of a language and a manner for which each client is to receive communications. A session identifier is provided as a public key for a client communication session between clients which seek to communicate. A dynamic link is created over a network between a client and a service for communications using the public and private key combinations. Communications are routed over the network using a web service. Communications are translated using a translation service provided by the web service which employs attributes associated with the private key and the public key combination to provide response information in a designated language to enable multi-lingual real-time communications. The communications and translations of the communications are provided to all clients participating in the session in accordance with the selection of the language of each client.

A system for real-time multi-lingual communications, includes a client device including a program configured to request a session and generate a channel identifier representing a private key where the private key includes a selection of a language and a manner for which each client is to receive communications. A server is connected to the client over a network and includes a web service configured to provide a session identifier as a public key for a client communication session between clients which seek to communicate such that a dynamic link is created over the network between a client and the web service for communications using the public and private key combinations. The web service is configured to route communications over the network. The web service includes a translation service for translating communications, which employs attributes associated with the private key and the public key combination to provide response information in a designated language to enable multi-lingual real-time communications.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
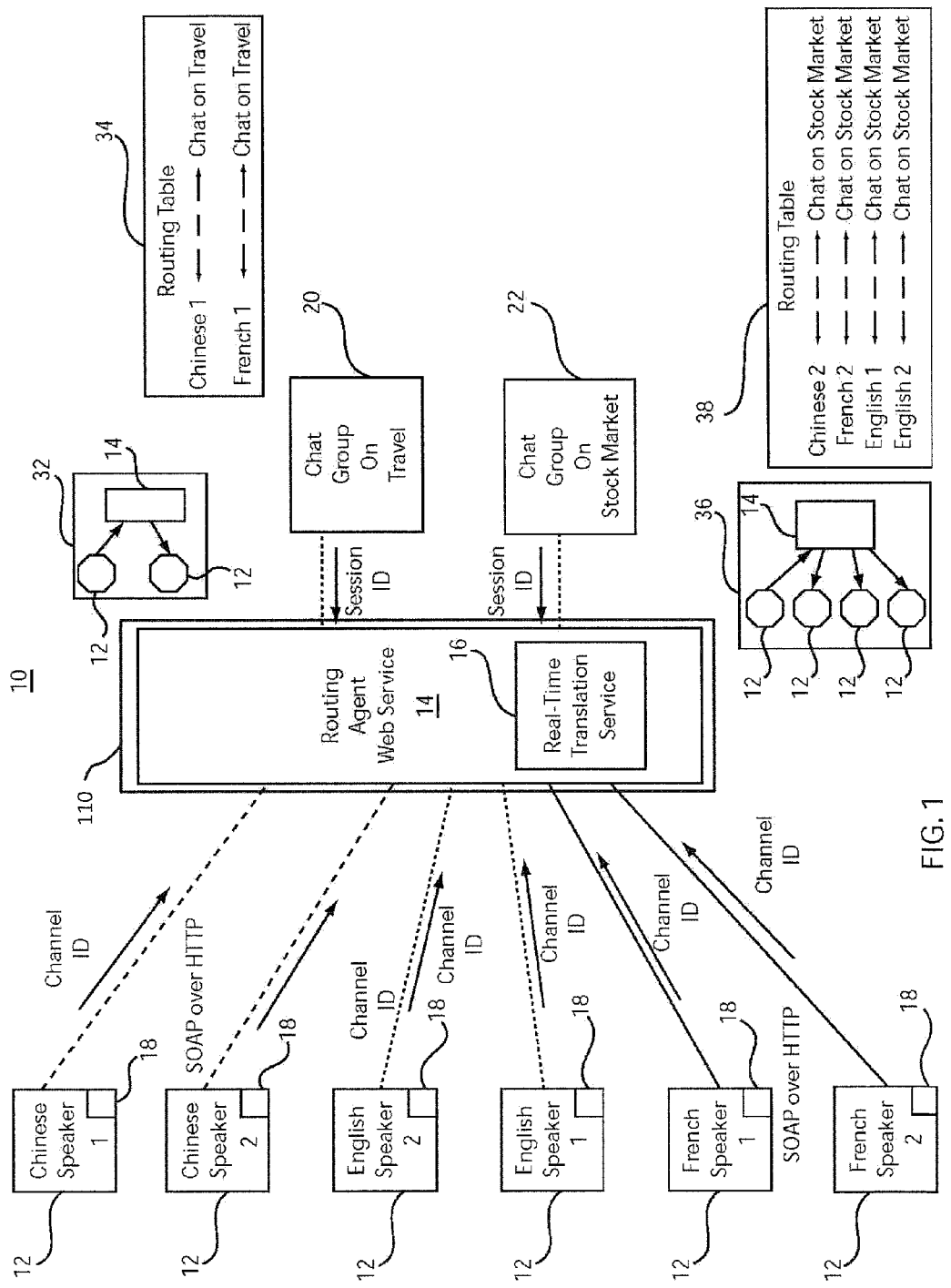
FIG. 1 is a block/flow diagram of a system/method showing real-time chat groups with participants communicating in a plurality of different languages by employing a web service with translations in accordance with the present principles.

In accordance with the present principles, an open architecture based solution is provided for language translations.

In one embodiment, the architecture is based on a web service, a software system which supports interoperable interaction over the network, specifically the Internet, including the traversal of firewalls. The open architecture preferably uses a public key (Organizer's Session ID) and a private key (Participant's Session ID) to dynamically connect each participant to a right interest group (topic/domain group). The architecture supports speech-to-speech, text to text, and text to speech translation systems over the internet or other network, which can be accessed from all over the world with a personal computer (PC), personal digital assistant (PDA), a mobile phone or similar network devices. The open structure based on a web service using public and private key pairs provides access to real-time cross-lingual conversations for large populations over the internet or other network.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, a system/method 10 includes an open architecture for multilingual interactions of a network. Speech-to-speech translation systems for internet use are provided. A client 12 communicates with a server through a web service 14. The web service 14 offers standardized access to internet services or other network services. The service preferably can pass all firewalls, and is also not limited by a platform's Operating System and a programming language used by the application. Thus, the client 12 can communicate with the server 110 without difficulty. The system 10 avoids transmitting raw voice data to lower the transmission bit rate between the client 12 and server 110. Speech features are extracted at the client 12 and sent to the server 110 to perform speech recognition and translation 16.

In one example of the speech recognition component 16, the corresponding transmission bit rate is maybe, e.g., 41.6 kbps without compression, which is much lower than that of voice data. The speech recognition performance can be guaranteed because no distortion occurs in this procedure. The transmission bit rate can be further reduced to, for example, 4 kbps by using various compression algorithms such as a Vector Quantization (VQ) technique, and the speech recognition performance will be influenced slightly. These bit rates are illustrative of the reductions achievable in accordance with the present embodiment and should not be construed as limiting.

In the present system 10, server 110 resources are saved by being used only on meaningful signals. This is achieved by adding a speech segmentation component 18 at the client 12. While the speech signal is being recorded, the segmentation component 18 is detecting boundaries between speech and silence or noise in the speech flow. Once a speech segment is detected, the related features are extracted and sent to the server to get the translation results, and the silence or noise segments are removed by the client 12.

A Distributed Speech Recognition (DSR) solution is based on transmitting extracted speech features rather than audio files with standard codec. Since the format of speech features is vendor specific, the DSR solution for speech to speech translation provides another level of security by using speech feature extraction as an encryption method.

By using the web service 14 based DSR approach for translation services, it is convenient for a client application to select a proper translation domain on demand. Domain selection can be set as a web service input parameter dynamically, and so it can be the selection of a language, if necessary. So the DSR based web service 14 approach enables the client 12 to use a domain-specific speech to speech translation service on demand.

This architecture 10 can be easily extended to a case where multiple parties participate in a networking community chat with translation services. With the DSR based web service model, a chat organizer 20 or 22 sends a unique session ID (public key) to the web service 14 for identifying a call and either broadcasts the key to each participant, or publishes it in a location accessible to the networking community. Each individual participant 12 creates a channel ID (private key) by appending attributes such as language, domain, location, user ID, to the public key. A participant (12) can send a request to the web service 14 with the private key. The hosting translation service 16 will select these individual parties based on the public key to permit a large call group. Next, the translation service 16 classifies these individual participants into small groups based on the key elements inside their private keys. For example, people who speak Chinese only will be in one group, and depending on the domain (interest field), they are further divided into small groups, such as "Chinese Travel in Beijing", "Chinese Travel in Shanghai".

The web service 14 with the translation function 16 will act as an intelligent routing agent to organize this multilingual chat in different domains or groups 20, 22. The destination of a translated utterance is dynamically determined by the attributes in the original request and the content of the utterance, such as language and domain. For example, an English speaking participant has a question to the people who live in east coast of China, and the web service host 14 with translation service 16 will send the final translated utterance to a small group who has the best match for language and domain. Therefore, this architecture 10 is an open architecture. This open architecture makes it possible to apply this solution over large populations over the internet.

In an illustrative example, a large number of members or clients 12 of a networking community want to participate in a multi-lingual chat via voice, text or both on different topics. The multi-modal inputs are expected to be presented to each participant in the language of their choice. The chat organizer 20 or 22 creates a unique session ID (public key) and submits it to the web service 14 for registering a call and posts the key in public through the networking community. The individual user client 12 downloads client software including a DSR front-end, and a text to speech (TTS) synthesizer, if necessary.

The individual participant 12 creates an individual channel ID (private key) by appending all tags (such as source language, target language, domains, location, action ID) to the public key. Then, the participant 12 can send a web service request to the hosting web service 14 with its private key and the attachment body (text, or voice in speech features). The web service 14 may include a Simple Object Access Protocol (SOAP) (XML protocol) over Hypertext Transfer Protocol (HTTP). The web service request may use standard HTTP ports, so it can go through firewalls.

The hosting web service 14 with translation function 16 acts as an intelligent multi-lingual routing agent to dynamically deliver a request to the right chat group and distribute the input to all registered clients in the correct language inside a selected chat group. In inset 32, the web service 14 includes a routing table 34 that ensures the clients 12 receive the appropriate language translation in accordance with the appropriate chat group 20. In inset 36, the web service 14 includes a routing table 38 that ensures the clients 12 receive the appropriate language translation in accordance with the appropriate chat group 22.

The hosting translation service 16 will select these individual clients 12 based on the public key to maintain a large call group. The translation service classifies these individual participants into small groups based on the key tags inside their private keys. For example, the people who want to speak to Chinese only will be in one large group (target language is Chinese). Depending on the domain (topic), these clients are further divided into smaller groups, as needed. The destination of a translated utterance will dynamically be determined by the tags in an original request.

Figure 2:
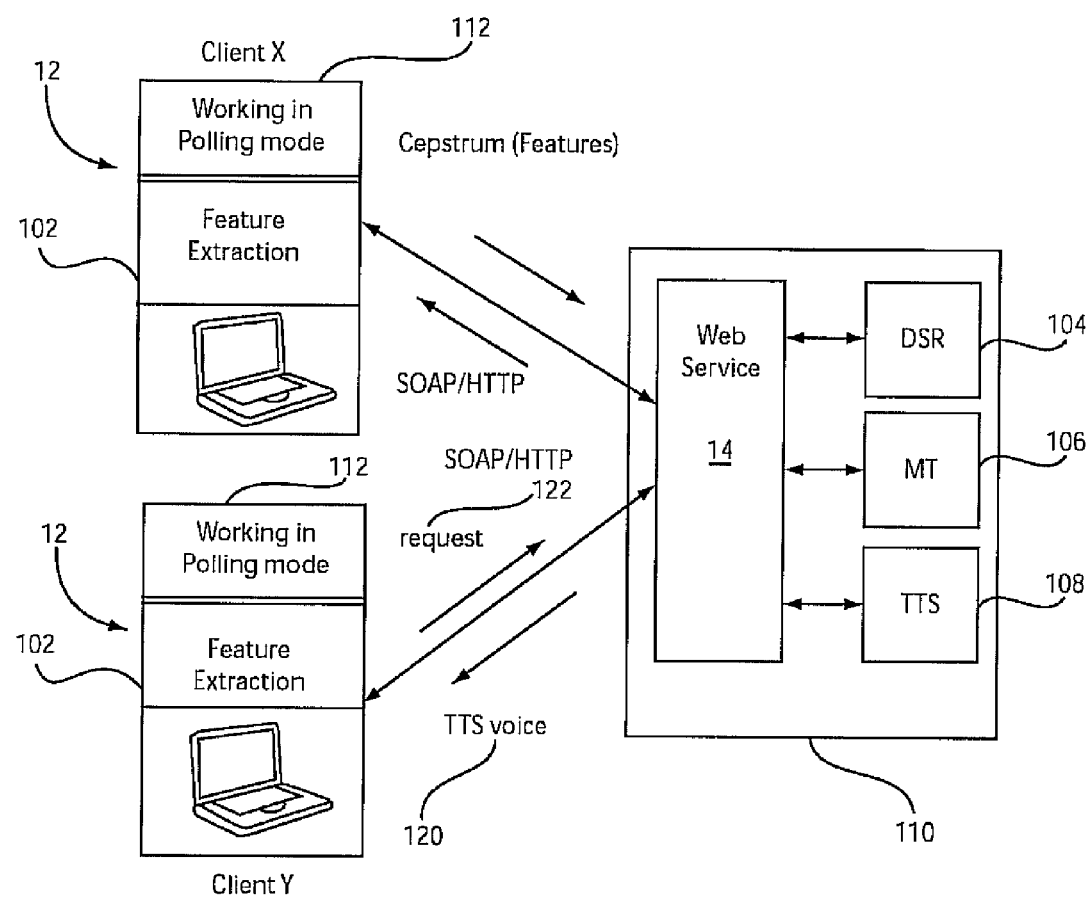
FIG. 2 is a block/flow diagram of a system/method showing real-time communication between two clients in different languages by employing a web service with translations in accordance with the present principles.

Referring to FIG. 2, a cross-lingual chat between two clients 12, designated as client X and client Y, is illustratively shown. The public and private key combination is used to create a dynamic link between a client 12 and services 14. The context of a submitted request and filters to be applied to the data passed to the client 12 are fully defined by these key combinations. The attributes associated with the key combination define filters to be applied to the data passed back to the client. In other words, the private key is generated with designations that enable that client to receive translations of a selected language or communications of a particular type. This is useful to provide security or age or class-specified filtering of content, such as for certain communications not appropriate for children or the like.

The web service 14 is employed as an intelligent routing agent and is responsible for distributing message load. All the clients 12 subscribe to a specific topic/domain by polling for available data, data sources or information related to joining a session group which may be delivered by voice, text or video in a polling mode 112. The dynamic access to the distributed services 14 is provided for any device with network presence (e.g. PC, PDA, mobile phone, etc.).

Network activities which can be driven by this dynamic key combination will be in a broad range, such as text or voice translation, image and video sharing across-languages, internet competition across-languages. The services 14 include Distributed Speech Recognition (DSR) 104, machine translation (MT) 106 and text to speech (TTS) 108, among others.

The DSR module 104 receives transmitted extracted speech features, such as cepstrum features, rather than audio files with standard codec. Since the format of speech features is vendor specific, the DSR module 104 for speech to speech translation provides another level of security by using speech feature extraction as an encryption method. The DSR module 104 provides translation services and is convenient for a client application to select a proper translation domain on demand. Domain selection can be set as a web service input parameter dynamically, and so it may include the selection of a language. The DSR based web service 14 enables the client 12 to use a domain-specific speech to speech translation service on demand.

To further illustrate the present advantages, an illustrative example will be presented. A dynamical key combination based method can be used for cross-lingual personal ID checking on the internet. Each individual ID includes a private key, and the requirement for a particular group/domain is a public key. This can be used in a social network to check personal IDs across-languages and to provide security, e.g., to protect teenage and child groups.

In a cross-lingual web conference call scenario, a participant (client 12) can speak in a first language, and a server 110 may employ a second language (based on the public key). Each request 122 can present all information though its private key, and the server 110 can distribute the translated message (speech, text, video), e.g., text to speech voice 120 to an individual participant in a proper language (e.g., the first language as selected by the user). In this way, each client 12 can speak in his/her native tongue and receive responses from other participants in that participant's native tongue even though the participants are speaking in other languages.

Figure 3:
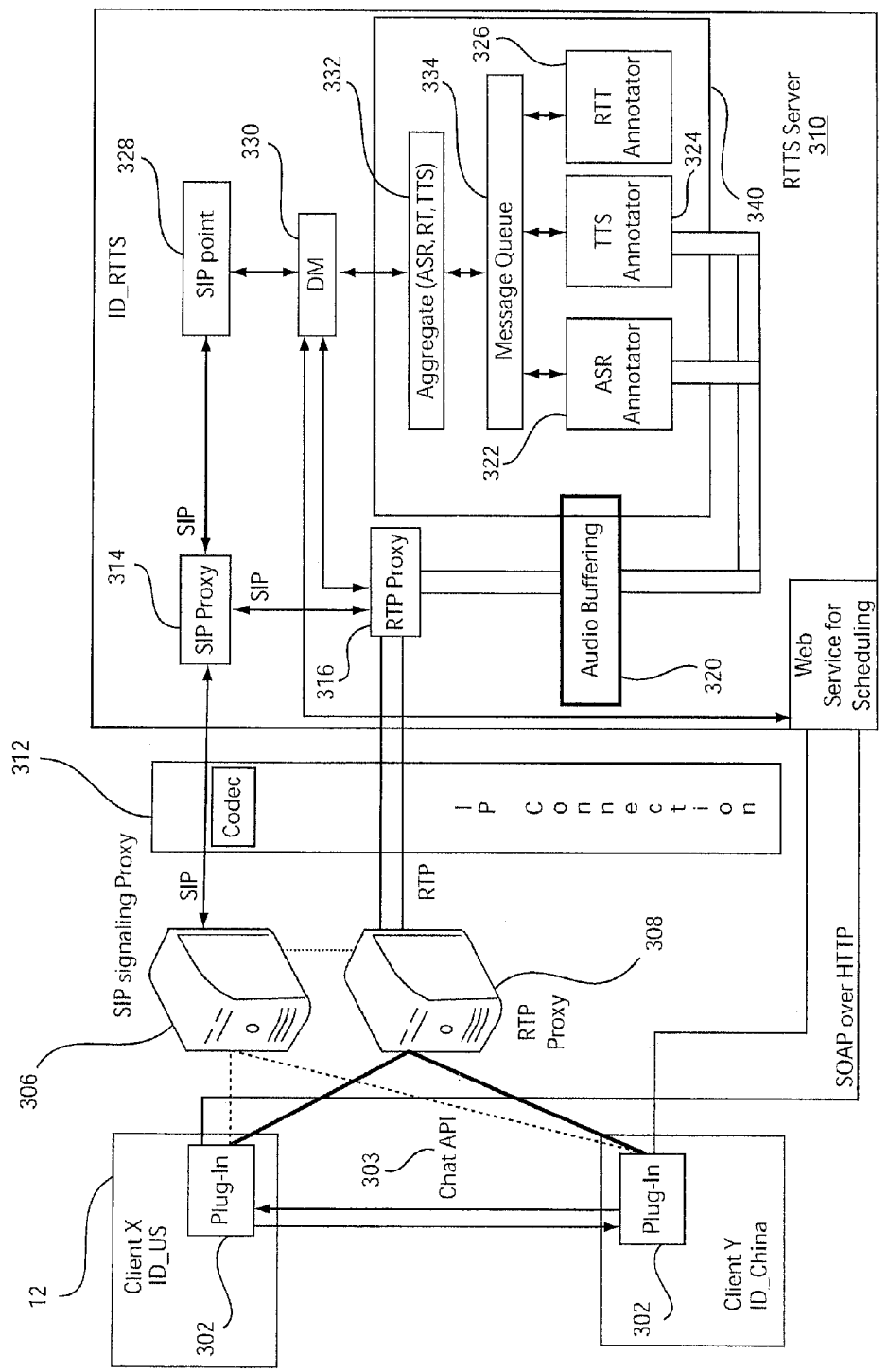
FIG. 3 is a block/flow diagram of a system/method showing greater details of FIG. 2 for real-time communication between two clients in different languages with streaming data in accordance with the present principles.

Referring to FIG. 3, further details on an exemplary embodiment are described for a streaming mode where information is streamed over a network, e.g., using voice over internet protocol (VoIP) telephone communications. Three IDs are employed: ID_US, ID_China, for client X and Y (12) and ID_RTTS for a real-time translation server (RTTS) 310. Clients X and Y may employ a telephone interface using for example a VoIP interface. Both ID_China and ID_US have installed a plug-in 302, which permits access to the web services provided and enables the use of multi-lingual communications by permitting the collection of speech features.

A user, client X, in the US wishes to speak to a user, client Y, in China. Assume they have the needed ID in their individual contact list. Client X or ID_US selects client Y or ID_China and presses a "call button", which sends a request to ID_China by using a Chat application program interface (API) 303. ID_China presses its "accept call" button to indicate readiness. After ID_US receives an acknowledge from ID_China, ID_US sends a request to an RTTS web service for call scheduling 318. The RTTS web service 318 will generate channel IDs with a language tag such as number.001 (English) and number.002 (Chinese) ("number" may be a telephone number). These two numbers are returned to ID_US, and these two numbers are passed on to a dialog manager (DM) 330.

ID_US passes number.002 (Chinese) to ID_China through the Chat API 303. Both ID_US and ID_China start to call RTTS server 310 by using individually assigned channel IDs number.001 and number.002. An RTTS session initiation protocol (SIP) endpoint program 328 will handle these two incoming calls, based on a given channel ID with language tags, separately. The present example shows an internet protocol connection 312 and employs Session Initiation Protocol (SIP) signaling proxy 306 and a Rapid Transport Protocol (RTP) Proxy 308 which includes a coder/decoder (codec) 307. The server 310 also illustratively includes a SIP Proxy 314 and a RTP proxy 316 to provide the appropriate communication protocol between clients 12 and server 310. Other network protocols and hardware are also contemplated. The present embodiments should not be construed as limited by the configurations shown.

After two calls are established, push and talk (P&T) buttons on both clients 12 may indicate a ready to call status. The P&T buttons may be generated as part of the plug-in program and may be generated on a computer screen along with any indicators or the buttons and indicators may be provided on a telephone device. ID_US presses the P&T button and sends audio streaming to the RTTS 310. In one example, the audio stream is packaged by Dual Tone Multi-Frequency (DTMF) keys at the beginning and end). When received, the audio stream may be buffered in an audio buffer 320.

A request is also sent to an RTTS web service 318 to wait for the text results. The RTTS 310 may play back the incoming audio to the channel connected to ID_China. The RTTS dialog manager (DM) 330 sends this incoming audio stream to a translation service module 340. The module 340 may include automatic speech recognition (ASR) annotator 322, real-time translation (RTT) annotator 324 and text to speech (TTS) annotator 326. DM 330 retrieves the recognition results and translation results in text back from an aggregator 332 as long as they are available from a message cue 334. The DM 330 sends the messages back to ID_US. ID_US displays the results in its chat window, and at the same time sends these results to ID_China for displaying. Confirmations of these results may be employed to ensure the messages were received. The translated TTS voice-ready DM 330 may deliver the voice based on channel ID to ID_China through RTP. ID_China can then press the P&T button and conversations can continue.

Figure 4:
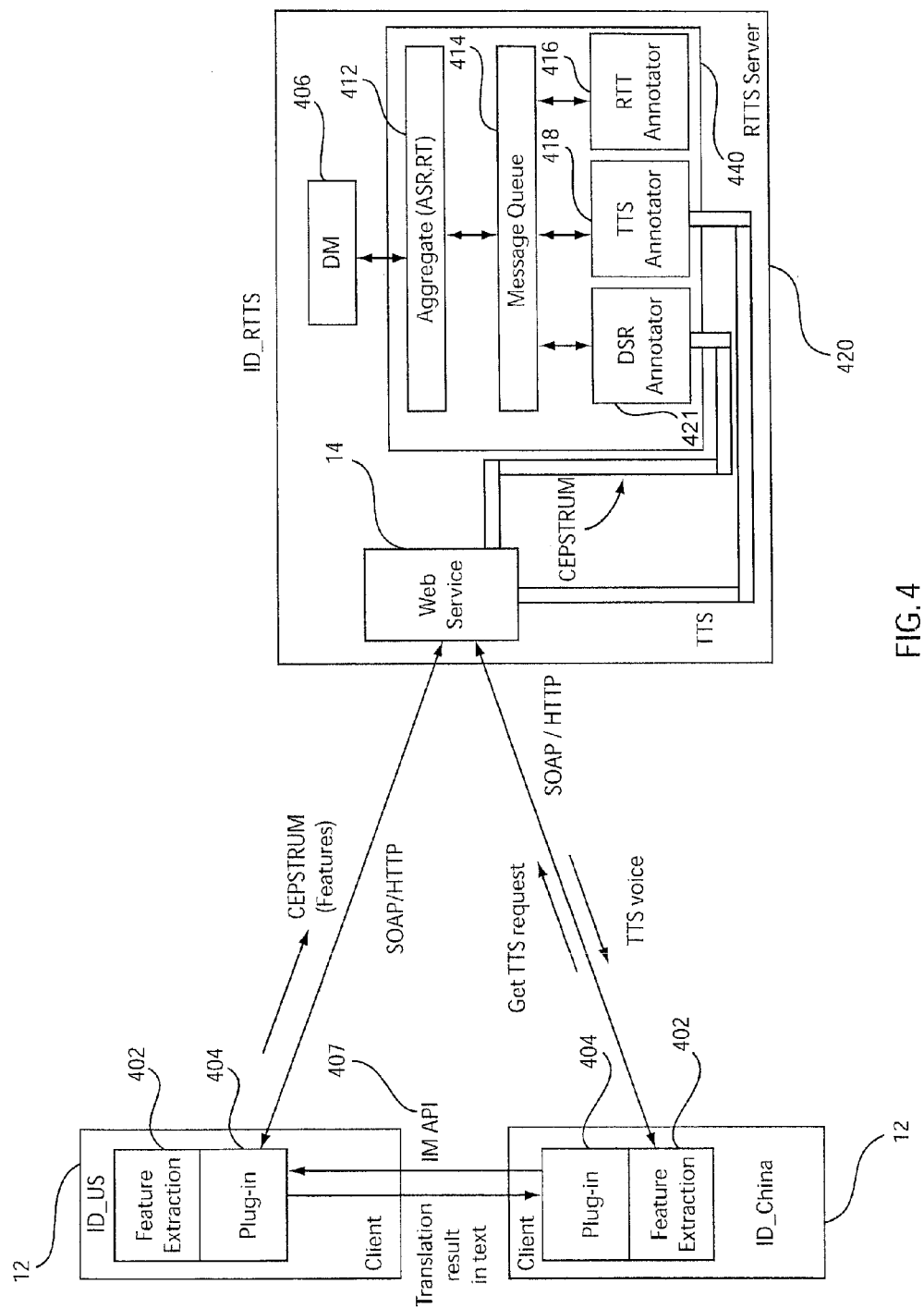
FIG. 4 is a block/flow diagram of a system/method for real-time communication between two clients in different languages in a web service mode in accordance with the present principles.

Referring to FIG. 4, further details on the exemplary embodiment of FIG. 2 are described for a web service mode. Client IDs include ID_US, and ID_China. Both ID_China and ID_US have installed a plug-in 404, which provides the needed functionality to perform interfacing tasks, generate indicators, etc.

A user (client 12) in the US wants to talk to a user in China. Both users have the needed ID in their individual contact list. ID_US selects ID_China and presses a P&T button. ID_US's voice is transformed to Cepstrum/Features by a feature extraction module 402, and the features are transmitted to an RTTS server 420, preferably through SOAP/HTTP. ID_US sends a start signal to ID_China. ID_China sends a "get result" request to the RTTS server 420 through SOAP/HTTP. The RTTS server 420 includes web services 14, which provide a translation service module 440 that performs recognition, translation, and TTS.

The module 440 may include a distributed speech recognition (DSR) annotator 421, text to speech (TTS) annotator 418 and a real-time translator (RTT) annotator 416. DM 406 retrieves the recognition results and translation results in text back from an aggregator 412 as long as they are available from a message cue 414. The DM 406 manages the dialog between the participants and responds back to ID_US with recognition results and translated results in text. ID_US displays the results in its chat window, and at the same time can send the translated results to ID_China for displaying using, e.g., an instant messaging (IM) API 407. Confirmations may be employed to ensure the messages were received. In this example, the RTTS server 440 responds back to ID_China with TTS, and the plug-in 404 plays back this TTS to ID_China.

Having described preferred embodiments for an open architecture based domain dependent real time multi-lingual communication service (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for real-time network communications, comprising:
    providing a session identifier as a public key for group communication between clients;
    providing a channel identifier representing a private key for each of a plurality of clients, the channel identifier including client-specific attributes, which function to indicate grouping criteria for the group communication;
    creating a dynamic communication link over a network between a client and a service based upon the public and private key combination such that group communication is enabled based upon the attributes of the private key and the public key; and
    translating communications using a translation service which employs the attributes associated with the private key and the public key combination to provide response information in a designated language to enable multi-lingual real-time communications.

2. The method as recited in claim 1, wherein translating communications includes translating at least one of speech, text and video.

3. The method as recited in claim 1, wherein the response information for a client includes one of speech, text and video in accordance with selection information provided in the private key.

4. The method as recited in claim 1, wherein the translation service includes at least one of distributed speech recognition, automatic speech recognition, real-time translation, machine translation and text to speech synthesis.

5. The method as recited in claim 1, further comprising:
    extracting features from speech utterances of a client; and
    sending acoustic features of the utterances to the web service.

6. The method as recited in claim 1, wherein providing a session identifier includes providing a session identifier for at least one of a chat group, a conference call and a telephone call.

7. The method as recited in claim 1, wherein providing a channel identifier includes appending the attributes including one of language, domain, location, user ID, to the public key.

8. A non-transitory computer readable medium comprising a computer readable program for real-time multi-lingual communications, wherein the computer readable program when executed on a computer causes the computer to perform the steps of:
    providing a session identifier as a public key for group communication between clients;

providing a channel identifier representing a private key for each of a plurality of clients, the channel identifier including client-specific attributes, which function to indicate grouping criteria for the group communication;

creating a dynamic communication link over a network between a client and a service based upon the public and private key combination such that group communication is enabled based upon the attributes of the private key and the public key; and translating communications using a translation service which employs the attributes associated with the private key and the public key combination to provide response information in a designated language to enable multi-lingual real-time communications.

9. A method for real-time multi-lingual communications, comprising:

providing a session identifier as a public key for a client communication session between clients which seek to communicate;

providing a channel identifier representing a private key for each of a plurality of clients where the private key includes a selection of a language and a manner for which each client is to receive communications;

creating a dynamic link over a network between a client and a service for communications using the public and private key combinations;

routing communications over the network using a web service;

translating communications using a translation service provided by the web service which employs attributes associated with the private key and the public key combination to provide response information in a designated language to enable multi-lingual real-time communications; and providing the communications and translations of the communications to all clients participating in the session in accordance with the selection of the language of each client.

10. The method as recited in claim 9, wherein providing a session identifier includes providing a session identifier for at least one of a chat group, a conference call and a telephone call.

11. The method as recited in claim 9, wherein translating communications includes translating at least one of speech, text and video.

12. The method as recited in claim 9, wherein the response information for a client includes one of speech, text and video in accordance with the selection provided in the private key.

13. The method as recited in claim 9, wherein the translation service includes at least one of distributed speech recognition, automatic speech recognition, real-time translation, machine translation and text to speech synthesis.

14. The method as recited in claim 9, further comprising:
extracting features form speech utterances of a client; and
sending acoustic features of the utterances to the web service.

15. The method as recited in claim 9, wherein providing a channel identifier includes appending the attributes including one of language, domain, location, user ID, to the public key.

16. A non-transitory computer readable medium comprising a computer readable program for real-time multi-lingual communications, wherein the computer readable program when executed on a computer causes the computer to:

providing a session identifier as a public key for a client communication session between clients which seek to communicate;

providing a channel identifier representing a private key for each of a plurality of clients where the private key includes a selection of a language and a manner for which each client is to receive communications;

creating a dynamic link over a network between a client and a service for communications using the public and private key combinations;

routing communications over the network using a web service;

translating communications using a translation service provided by the web service which employs attributes associated with the private key and the public key combination to provide response information in a designated language to enable multi-lingual real-time communications; and providing the communications and translations of the communications to all clients participating in the session in accordance with the selection of the language of each client.

17. A system for real-time multi-lingual communications, comprising:

a client device including a program configured to request a session and generate a channel identifier representing a private key where the private key includes a selection of a language and a manner for which each client is to receive communications;

a physical server connected to the client over a network and including a web service configured to provide a session identifier as a public key for a client communication session between clients which seek to communicate such that a dynamic link is created over the network between a client and the web service for communications using the public and private key combinations, the web service being configured to route communications over the network; and the web service including a translation service for translating communications, which employs attributes associated with the private key and the public key combination to provide response information in a designated language to enable multi-lingual real-time communications.

18. The system as recited in claim 17, wherein the server includes a dialog manager configured to manage the communications between the clients such that the communications and translations of the communications to all clients participating in the session are in accordance with the selection of the language of each client.

19. The system as recited in claim 17, wherein a context of a submitted request and filters to be applied to data passed to the client are defined by the private and public key combination.

20. The system as recited in claim 17, wherein the attributes associated with the key combination define filters to be applied to the data passed back to the client.

21. The system as recited in claim 17, wherein the web service is used as an intelligent routing agent and is responsible for distributing message load.

22. The system as recited in claim 17, wherein the clients in a session subscribe to a specific topic/domain by polling for data which is delivered by at least one of speech, text and video.

23. The system as recited in claim 17, wherein the session includes a cross-lingual web conference call.

24. The system as recited in claim 23, wherein a client request presents all information through the private key, and the server has a common language in association with the public key and distributes a translated message to individual participants in their respective languages.

* * * * *